Nov. 20, 1923.  L. W. BALDWIN  1,474,429
PNEUMATIC TIRE
Filed Oct. 11, 1920
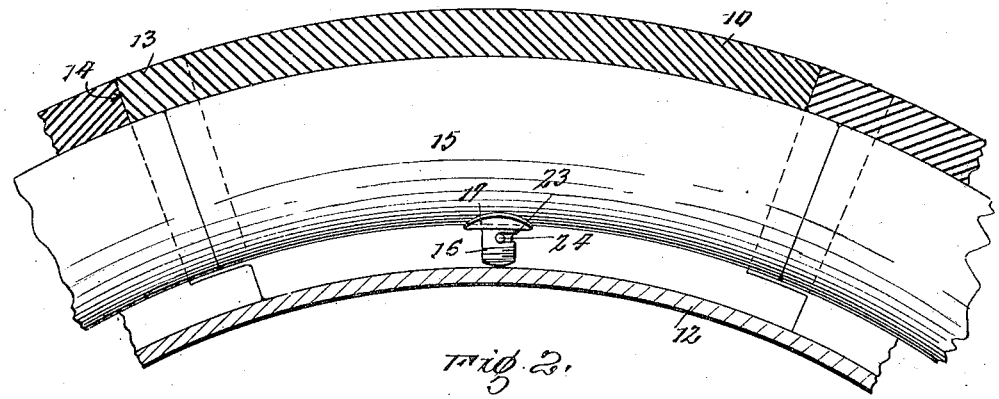
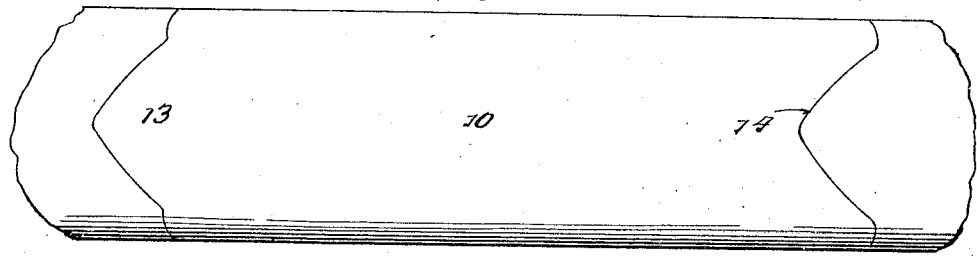
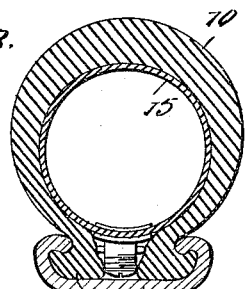
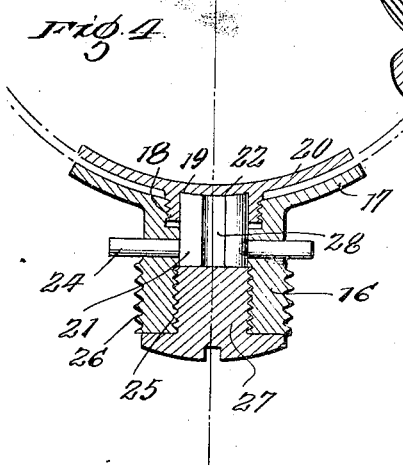
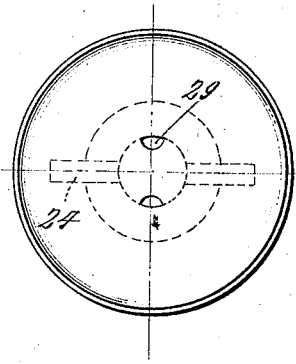
INVENTOR
Louis W. Baldwin
BY ATTORNEY Patented Nov. 20, 1923.

1,474,429

UNITED STATES PATENT OFFICE.

LOUIS W. BALDWIN, OF JERSEY CITY, NEW JERSEY.

PNEUMATIC TIRE.

Application filed October 11, 1920. Serial No. 416,032.

*To all whom it may concern:*

Be it known that I, LOUIS W. BALDWIN, citizen of the United States, residing at Jersey City, in the county of Hudson and State of New Jersey, have invented certain new and useful Improvements in Pneumatic Tires, of which the following is a specification.

This invention has relation to pneumatic tires for motor vehicles, and has for an object to provide a tire casing which may be made up in individual sections, intended for end to end engagement and attachment to an ordinary wheel rim whereby in the event that one or more sections become worn or damaged they may be readily removed and replaced by other sections.

Another object of the invention is to provide improved inner tubes for pneumatic tires in which the inner tubes are formed in arcuate sections, each individually inflatable so that when one section becomes punctured or damaged it may be removed and replaced by another.

A still further object of the invention is to provide an improved air valve for my inner tube.

In addition to the foregoing this invention comprehends improvements in the details of construction and arrangement of parts to be hereinafter described and particularly set forth in the appended claim.

In the accompanying drawings in which similar and corresponding parts are designated by the same characters of reference throughout the several views in which they appear, Figure 1 is a fragmentary view in section of a tire casing and inner tube constructed in accordance with my invention.

Figure 2 is a fragmentary view in plan of the tire casing.

Figure 3 is a transverse section taken through the combined tire casing and inner tube.

Figure 4 is a detailed view on an enlarged scale of the valve, and

Figure 5 is a view in top plan of the valve.

With reference to the drawings, 10 indicates a section of a tire casing constructed in accordance with my invention from which you will note that in transverse section it appears as an ordinary clincher tire having the clincher bead 11 for attachment within the ordinary tire rim 12. These sections are arcuate in configuration to conform to the curvature of the wheel rim and one end of each section is formed with a pointed or angular expansion 13, while the opposite end is formed with a correspondingly formed recess 14 in which to receive the point 13 of the next adjacent section. In this manner the sections are joined together and held against lateral displacement. If desired the outer surface may be formed with anti-skid lugs, suction cups or any manner desired to reduce skidding.

I also provide an inner tube consisting of a plurality of sections, each section being arcuate in formation as indicated at 15, and adapted to abut end to end with an adjacent section as shown in Figure 1. When sufficient sections are enclosed within a tire casing a complete inner tube is formed composed of individually inflatable sections. While I have shown these inner tubes as enclosed in my sectional tire casing as shown in Figure 1, it will be obvious that these inner tubes may be enclosed in a tire casing of ordinary construction either of the clincher or straight sided type. Attention is called to the fact that if my sectional tire casing is formed of the straight sided type additional clamping means must be provided to hold the edges together but any form of clamp suitable for the purpose can be employed.

Each sectional inner tube 15 is provided with an air valve consisting of a cylindrical valve casing 16 having a curved flange 17 formed at one end designed to engage the outer surface of the inner tube on the inner curvature thereof to conform to both lateral and longitudinal curvature of the inner tube. Said flanged end is recessed and internally threaded as at 18 to receive the threaded extension 19 of a curved disc member 20 which is designed to engage the inner side of the inner tube and to bind the edges of the inner tube between the flanges 20 and 17 as shown in Figure 4. The casing 16 is formed with a longitudinal bore in which a barrel valve 21 is inserted, one end of the valve being formed with spherical concaved surface 22, which engages a similarly formed surface upon the outer face of the flange 20 and also keep within a recess formed in the threaded extension 19 of said flange. The casing 16 is provided with a pair of oppositely disposed curved slots 23 through which oppositely extending pins 24 extend, said pins being mounted in the valve 21. The bore of the casing 16 is internally threaded as at 25 and externally threaded as at 26. A screw or plug 27 is inserted within the bore to engage the threaded portion 25 for a purpose to be presently noted. The side of the valve 21 at opposite points thereof are formed with semi-cylindrical depressions or passages 28 and the flange or disc 20 is formed with openings 29 designed for registration with said channels 28.

In operation, the nozzle of the pump is screwed upon the threaded portion 26 of the valve casing 16 and the barrel valve 21 rotated by means of the pins 24 to bring the channel 28 thereof in registration with the openings 29. The inner tube section 15 may now be inflated to the desired pressure. The barrel valve 21 is then rotated by means of the pins 24 to the limit of its movement which will throw the channels 28 and openings 29 out of registration and prevent the exit of air. To ensure a tight joint the plug 27 is screwed up tight which presses the barrel valve 21 against 20 forming a tight joint.

From the foregoing description it will be seen that I have provided a novel combination in a pneumatic tire in which the tire casing is formed in sections 10, any one of which may be readily removed and replaced by a new section, and in which the inner tube is also formed in section to permit displacement in the event that any one of them should become punctured. Thus, a tire is provided which can be repaired more quickly and more economically than tires of the conventional type in which the element that is both the casing and inner tubes are one continuous integral element. Other uses and advantages will readily occur to those familiar to the art to which this invention appertains.

While I have illustrated and described my invention with some degree of particularity I realize that in practice various alterations therein may be made. I therefore reserve the right and privilege of changing the form of the details of construction or otherwise altering the arrangement of the correlated parts without departing from the spirit of the invention or the scope of the appended claim.

Having thus described my invention what I claim as new and desire to secure by United States Letters Patent is:—

As a new article of manufacture, an automobile tire comprising a casing and a pneumatic inner tube, the casing and inner tube including a plurality of independent sections, each section of the casing consisting of an open ended body having a V-shaped tongue formed on one end thereof and a V-shaped notch formed in the opposite end thereof, each section of the inner tube including an annular inflatable body and a filling air valve, the air valves of the sections of the inner tube being disposed within the plane of the casing.

In testimony whereof I affix my signature.

LOUIS W. BALDWIN. [L. S.]